United States Patent Office 2,956,075
Patented Oct. 11, 1960

2,956,075

METHOD FOR PREPARING 1,8-DICYAN-2,6-OCTADIENE

Gioacchino Boffa and Dino Costabello, Novara, and Adolfo Quilico, Milan, Italy, assignors to Montecatini-Societa Generale per l'Industria Mineraria e Chimica, a corporation of Italy No Drawing. Filed July 29, 1957, Ser. No. 674,563

Claims priority, application Italy Aug. 3, 1956

6 Claims. (Cl. 260—465.8)

This invention relates to a method for preparing 1,8-dicyano-2,6-octadiene.

A method of preparing 1,8-dicyano-2,6-octadiene by a condensation reaction carried out on 1-chloro-4-cyano-2-butene, using Ni(CO)$_4$, is known. The latter reacts according to the following equation:

2(Cl—CH$_2$—CH=CH—CH$_2$—CN)+Ni(CO)$_4$ →

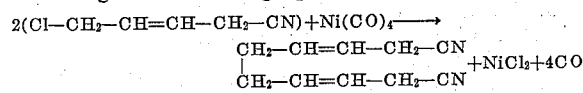

1,8-dicyano-2,6-octadiene is an important intermediate for the preparation of sebacic acid or decamethylene diamine, which can be obtained according to the following reaction schemes:

(a)  
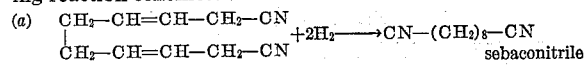

NC—(CH$_2$)$_8$—CN+4H$_2$O+2HCl ——→
HOOC—(CH$_2$)$_8$—COOH+2NH$_4$Cl
sebacic acid (b)  
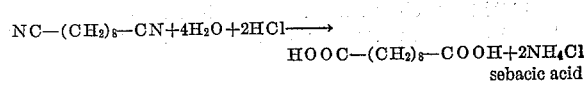

We have now found that the aforementioned condensation reaction proceeds in a different direction and can be applied more advantageously, if iron metal powder in its various commercially available forms (e.g. iron powder produced mechanically by porphyrization, by reduction of iron oxides, etc.) is used, with or without added activators such as Ni and Co.

We also found that the quality of the iron powders used and the presence or absence of an activator have a certain influence on the course of the reaction, the yield and the quantitative distribution of the resulting products among the various isomers described hereinbelow.

The types of reduced iron more suitable for the claimed purposes are those of a low apparent density, whose optimum value is included in the range 1.5 to 2.

The iron obtained by reduction in hydrogen stream, at the termperature of about 600°, of pyrite cinders merely sifted at 16,000 meshes/cm.² has proved, besides of being extremely cheap, to allow the best yields to be attained.

As regards the employment of suitable catalysts, an outstanding advantage is achieved by adding to the reaction mass the Ni salts and preferably the chloride. They act as accelerators of the reaction rate, so as to allow the condensation reaction to be carried out at a low temperature (between 40° and 60° C.), so that said reaction is directed towards the right chain dicyano-octadiene, while inhibiting the formation of byproducts.

The nature of the solvent or diluent used also has a decided influence upon the process. Of the solvents or diluents with which we experimented, aliphatic nitriles of low molecular weight (particularly acetonitrile), were found to be most useful.

However, it has also been found that other solvents of polar nature, such as ethyl alcohol, allow very good conversions of the chloro-cyano-butene to linear dicyano-octadiene to be attained.

The over-all reaction may be illustrated as follows:

Upon treating 1-chloro-4-cyano-2-butene with iron powder, primarily two isomers (I and II) are formed, 2Cl—CH$_2$—CH=CH—CH$_2$—CN+Fe→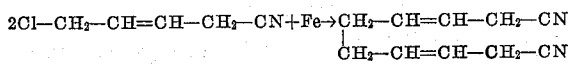

I
1,8-dicyano-2,6-octadiene

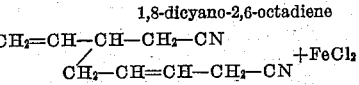

II
2-vinyl-1,6-dicyano-4-hexene

A principal object of this invention is to suppress the formation of the branched isomer II, to increase the yield of the linear isomer I, which is the more valuable compound.

When carrying out the condensation reaction a nitrile of the formula C$_{15}$H$_{17}$N$_3$ is also formed which, apparently, originates from three mols of chlorocyanobutene, but whose structure has not been determined, as yet.

A further object of this invention is to provide exclusively the 1,8-dicyano-2,6-octadiene by performing, under suitable operating conditions, the condensation of the 1-chloro-4-cyano-2-butene to achieve yields higher than 90%.

These and other objects and advantages will appear more clearly from the herein-following specific examples:

EXAMPLE 1

*Condensation reaction of chloro-cyanobutene*

118 g. (1.02 mols) 1-chloro-4-cyano-2-butene, 32 g. (0.575 mol) iron powder and 230 cc. acetonitrile are heated to 85° C. for 8 hours in a CO$_2$ atmosphere.

After concentration to small volume, treatment of the residue with diluted hydrochloric acid and ether extraction, 25 g. unreacted chlorocyanobutene, 42 g. dicyanoctadienes having a boiling point of 130–140° C. at 0.2 mm., and 10 g. of a nitrile having the empirical formula C$_{15}$H$_{17}$N$_3$ (boiling point 210–215° C./0.2 mm.) are obtained.

The dicyanoctadiene yield based on the amount of chlorocyanobutene used is 63.8%. The mixture of dicyanoctadienes consists of about 40% of the dicyanoctadiene I having a straight chain structure.

EXAMPLE 2

115.5 g. chloro-cyanobutene, 230 ml. acetonitrile, 51 g. reduced iron (obtained from pyrite cinders with a 76% Fe content of apparent density 1.5) and 18 g. NiCl$_2$.6H$_2$O are heated while stirring for 7 hours at 50°–55° C. After filtration and removal of acetonitrile under vacuum of 200 mm. the residue is taken again with diluted H$_2$SO$_4$, whereby a double layer separates. The layer of organic substance, when separated in the warm and distilled off under vacuum yields 3 g. unreacted chlorocyanobutene and 70.5 g. dicyano-octadiene (solidification temperature 43° C.); the yield is 91% based on the consumed chlorocyanobutene.

EXAMPLE 3

115.5 g. chlorocyanobutene, 230 ml. acetonitrile, 42.8 g. reduced iron from the hydroxide (91% Fe content, bulk density 2) together with 9 g. NiCl$_2$.6H$_2$O are heated for 7 hours at 55°–60° C.

When proceeding as in the foregoing example 1.8 g. of unreacted chloro-cyanobutene and 67.7 g. dicyano-octadiene (solidification temp. 42° C.) are obtained, with an 85% yield based on the consumed chlorocyanobutene.

EXAMPLE 4

115.5 g. chlorocyanobutene, 230 ml. 99.8% ethanol, 6.5 g. anhydrous NiCl$_2$ and 56 g. reduced iron obtained from pyrite cinders, with a 69% Fe content and bulk density 1.4, are heated for 7 hours at 60°–65° C. When proceeding as above said 1.7 g. unreacted chlorocyanobutene and 67.6 g. dicyano-octadiene (solidification temp. 42° C.) are obtained, the yield is 85% calculated on the basis of consumed chlorocyanobutene.

EXAMPLE 5

115.5 g. chlorocyanobutene, 230 ml. anhydrous ethanol, 6.5 g. anhydrous NiCl$_2$ and 51 g. of a mixture iron-nickel reduced from the corresponding hydroxides, with a bulk density 1.46, and a 70% iron and 7% Ni content are heated for 7 hours at 60°–65° C.

When proceeding as above said 1 g. unreacted chlorocyanobutene and 61 g. dicyano-octadiene (solidification temp. 39° C.) are obtained; the yield is 76% calculated on the basis of consumed chlorocyanobutene.

EXAMPLE 6

*Preparation of decamethylendiamine from the dicyanoctadiene*

200 g. dicyanoctadiene obtained according to Example 2 are dissolved in a mixture of 400 ml. methanol and 200 g. anhydrous NH$_3$, then hydrogenated upon 10 g. Raney Ni at 90° C.

After removal of NH$_3$ and methanol under ordinary pressure, the residue is rectified under a vacuum of 10 m./m.: 174 g. decamethylendiamine (B.P. 140° C./10 m./m.) are obtained.

We claim:

1. A method of making 1,8-dicyano-2,6-octadiene, comprising condensing 1-chloro-4-cyano-2-butene in an inert liquid diluent by means of iron metal powder as the condensing agent, said powder having a bulk density of about 1.4 to 2.

2. A method of making 1,8-dicyano-2,6-octadiene, comprising condensing 1-chloro-4-cyano-2-butene in an inert liquid diluent by means of iron metal powder as the condensing agent, said powder having a bulk density of about 1.4 to 2 and being obtained by reduction of pyrite cinders.

3. A method of making 1,8-dicyano-2,6-octadiene which comprises condensing 1-chloro-4-cyano-2-butene in a lower aliphatic nitrile by means of iron metal powder as the condensing agent, the iron powder having in admixture therewith an activator comprising a nickel salt, said iron powder being made by reducing pyrite cinders with hydrogen, and having an apparent density of about 1.4 to 2.

4. A method of making 1,8-dicyano-2,6-octadiene which comprises condensing 1-chloro-4-cyano-2-butene in a lower aliphatic alcohol by means of iron metal powder as the condensing agent, the iron having in admixture therewith a nickel halide salt, said iron powder being made by reducing pyrite cinders with hydrogen, and having an apparent density of about 1.4 to 2.

5. The process defined in claim 3, the nickel salt being nickel chloride, the reaction being carried out at between about 40° and 65° C.

6. The process defined in claim 4, the nickel salt being nickel chloride, the reaction being carried out at between about 40° and 65° C.

References Cited in the file of this patent

UNITED STATES PATENTS

| | | |
|---|---|---|
| 2,524,833 | Prichard et al. | Oct. 10, 1950 |
| 2,658,922 | Urban | Nov. 10, 1953 |
| 2,816,917 | Hansley et al. | Dec. 17, 1957 |